US012809670B2

(12) United States Patent

Alluboyina et al.

(10) Patent No.: US 12,809,670 B2

(45) Date of Patent: Nov. 24, 2026

(54) PROVISIONING TASKS ACROSS A PLURALITY OF CLUSTERS BASED ON PRIORITY AND GEOGRAPHIC PROXIMITY

(71) Applicant: Rakuten Symphony, Inc., Tokyo (JP)

(72) Inventors: Ravi Kumar Alluboyina, Santa Clara, CA (US); Sree Nandan Atur, Newark, CA (US); Nikhil Gawade, Pune (IN)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/251,067

(22) PCT Filed: Jan. 10, 2023

(86) PCT No.: PCT/US2023/060395

§ 371 (c)(1),
(2) Date: Apr. 28, 2023

(87) PCT Pub. No.: WO2024/151307

PCT Pub. Date: Jul. 18, 2024

(65) Prior Publication Data

US 2025/0321783 A1 Oct. 16, 2025

(51) Int. Cl.
*G06F 9/48* (2006.01)

(52) U.S. Cl.
CPC .................................. *G06F 9/4881* (2013.01)

(58) Field of Classification Search
None
See application file for complete search history.

(56) References Cited

U.S. PATENT DOCUMENTS

| | | | | |
|---|---|---|---|---|
| 6,230,303 | B1 * | 5/2001 | Dave | G06F 9/4887 716/133 |
| 6,934,294 | B2 * | 8/2005 | Bertagna | H04L 49/90 370/412 |
| 7,370,223 | B2 | 5/2008 | Olmstead | |
| 9,170,928 | B1 * | 10/2015 | Dantkale | G06F 12/0223 |
| 9,268,495 | B2 * | 2/2016 | Vogan | G06F 3/0659 |
| 9,686,204 | B2 * | 6/2017 | Kakadia | H04L 47/20 |
| 9,843,534 | B2 | 12/2017 | Mcfarlin | |
| 10,078,473 | B2 * | 9/2018 | Ahmed | G06F 3/0659 |
| 10,348,810 | B1 | 7/2019 | Florissi | |
| 10,404,787 | B1 | 9/2019 | Florissi | |

(Continued)

FOREIGN PATENT DOCUMENTS

| | | | |
|---|---|---|---|
| CN | 109067828 | B | 1/2022 |
| KR | 20150108230 | A | 9/2015 |

(Continued)

*Primary Examiner* — Van H Nguyen

(74) *Attorney, Agent, or Firm* — David R. Stevens; Stevens Law Group

(57) ABSTRACT

Systems and methods for multi-cluster worker management for speed and proximity use cases. A method includes providing a plurality of tasks to a priority-based backlog queue and provisioning each of the plurality of tasks to one of a plurality of clusters. Provisioning each of the plurality of tasks comprises provisioning based on a proximity-based allocation process. The proximity-based allocation process includes identifying a network element location associated with each of the plurality of tasks, identifying a geographic location for each of the plurality of clusters, and prioritizing a nearest cluster of the plurality of clusters.

16 Claims, 9 Drawing Sheets

(56) References Cited

U.S. PATENT DOCUMENTS

| | | | | |
|---|---|---|---|---|
| 10,700,991 | B2 | 6/2020 | Khinvasara | |
| 10,884,795 | B2 * | 1/2021 | Liu | G06F 9/5083 |
| 11,252,159 | B2 | 2/2022 | Kannan | |
| 11,316,763 | B1 | 4/2022 | Chitalia | |
| 11,461,130 | B2 * | 10/2022 | Koupy | G06F 9/4498 |
| 12,074,780 | B2 * | 8/2024 | Ikäheimo | H04W 24/06 |
| 2016/0226966 | A1 | 8/2016 | Lin | |
| 2016/0283135 | A1 | 9/2016 | Ahmed et al. | |
| 2020/0379794 | A1 | 12/2020 | Kim | |
| 2021/0271521 | A1 | 9/2021 | Kang | |
| 2022/0116452 | A1 | 4/2022 | Rafey et al. | |
| 2022/0158912 | A1 * | 5/2022 | Ikäheimo | H04W 24/06 |

FOREIGN PATENT DOCUMENTS

| | | |
|---|---|---|
| WO | 2015175671 | 11/2015 |
| WO | 2022104395 | 5/2022 |

* cited by examiner

PROVISIONING TASKS ACROSS A PLURALITY OF CLUSTERS BASED ON PRIORITY AND GEOGRAPHIC PROXIMITY

TECHNICAL FIELD

This disclosure relates generally to provisioning resources in a cloud computing environment, and specifically relates to provisioning tasks across one or more of a plurality of clusters.

SUMMARY

Systems and methods for multi-cluster worker management for speed and proximity use cases. A method includes providing a plurality of tasks to a priority-based backlog queue and provisioning each of the plurality of tasks to one of a plurality of clusters. Provisioning each of the plurality of tasks comprises provisioning based on a proximity-based allocation process. The proximity-based allocation process includes identifying a network element location associated with each of the plurality of tasks, identifying a geographic location for each of the plurality of clusters, and prioritizing a nearest cluster of the plurality of clusters.

BACKGROUND

Numerous industries benefit from and rely upon cloud-based computing resources to store data, access data, and run applications and tasks based on the stored data. In some cases, these industries require that a large quantity of tasks be completed in a short time period. In these cases, it can be important to provision the tasks across a plurality of computing and storage resources.

In traditional systems, batches of tasks are typically allocated based on a modified first come, first served or "round robin" approach. However, in containerized workload systems, round robin allocation can lead to failure to execute large batches of tasks because existing containerized workload systems are limited by the quantity of tasks that can be executed in parallel. Additionally, this traditional round robin placement fails to account for the geographical proximity between compute resources and the network elements for the tasks. This can lead to increased latency in the system.

In view of the foregoing, disclosed herein are systems, methods, and devices for provisioning a plurality of tasks across one or more of a plurality of compute resources based on priority and geographic proximity.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1A:
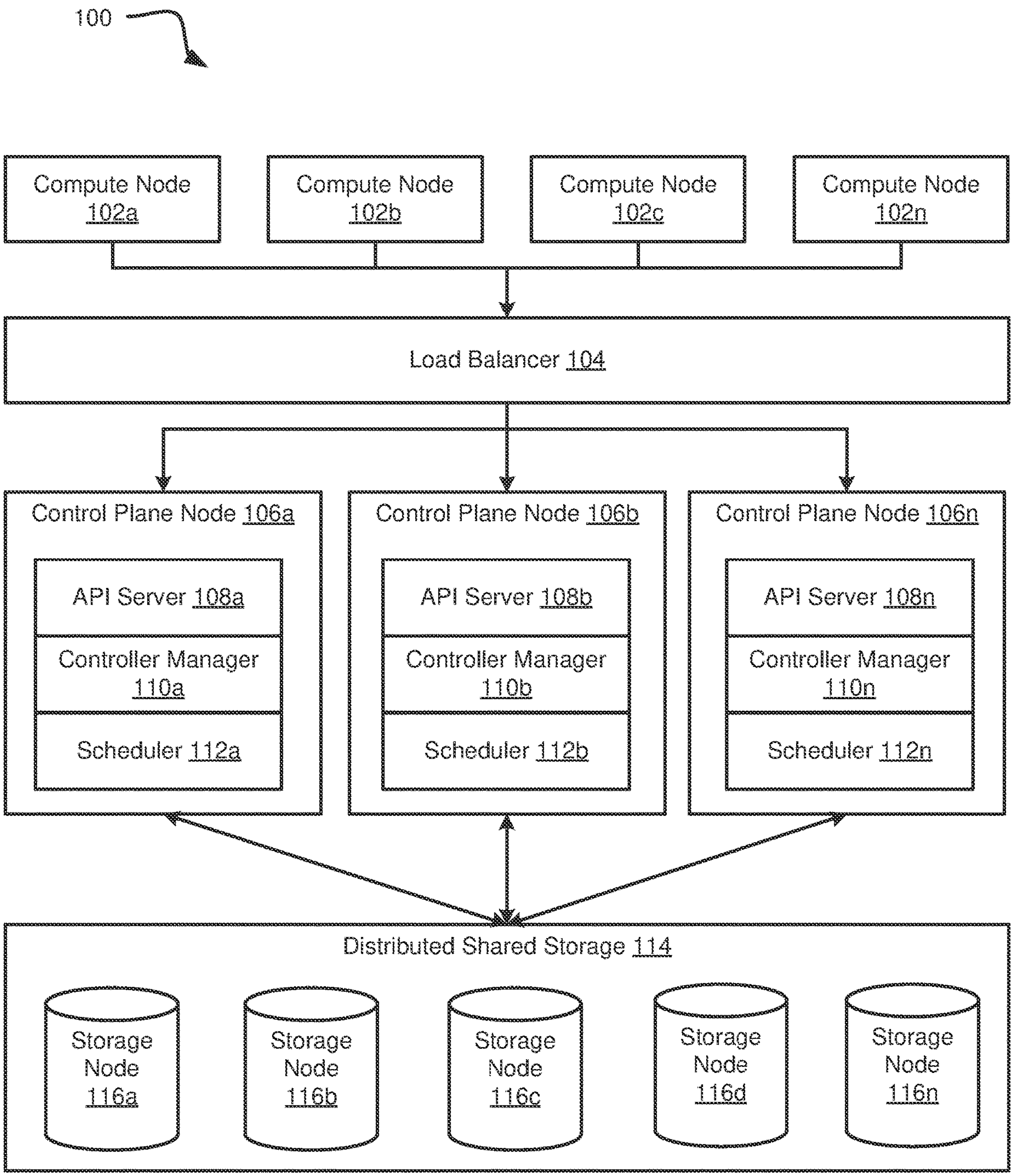
FIG. 1A is a schematic block diagram of a system for automated deployment, scaling, and management of containerized workloads and services, wherein the system draws on storage distributed across shared storage resources.

Disclosed herein are systems, methods, and devices for a multi-data center automation platform (MDCAP) that executes functions and workflows. The MDCAP described herein may be implemented with pods or containers associated with a workload Application Program Interface (API) object used to manage stateful applications. In specific implementations, the MDCAP described herein is implemented with StatefulSet pods operated by the Kubernetes® platform. The systems, methods, and devices described herein are implemented to improve performance by managing workers on multiple clusters for performance and proximity use-cases.

Some traditional systems enable users to execute business logic in the form of Kubernetes® tasks. These systems are configured to generate a container, execute the business logic, and then delete the container. These traditional systems may provide means to execute a batch of tasks locally on-premises or on the cloud. These tasks may include anything from building software, to managing a network, to provisioning an operating system, and so forth. When managing a large network of servers, these tasks may be implemented with a containerized workload system. However, these traditional systems are limited by the number of pods within the containerized workload system.

In traditional systems, one compute node within a cluster may bring a finite number of pods, and in most cases, a single compute node may bring a maximum quantity of 100 pods, but this quantity is configurable depending on the implementation. By default the number of pods may be set to around 110. Thus, in this example implementation of a traditional system, only 100 or 110 tasks may be executed in parallel. If a user implements ten compute nodes within the cluster in this example traditional system, then the user may execute 1,000 or 1,100 tasks in parallel, and so forth. However, upgrading the cluster to include additional compute nodes can take a long time and will increase system latency.

Additionally, in traditional systems, a round robin scheduling algorithm may be implemented to allocate workers within a cluster. However, when there is a large workload submitted for execution the round robin scheduling algorithm will degrade into a first come first serve scheduling with no priority given to any process or task. Additionally, when there is a large workload, existing products may not bring up workers on multiple clusters to finish execution. This issue may occur both locally on-premises or in the cloud.

Additionally, in traditional systems, the allocation of compute resources to certain tasks is not based on the geographical proximities of compute resources. Many batch executions are implemented for network elements located at certain geographic locations. In these cases, the physical distance between compute nodes and storage nodes will impact the amount of time taken to interact with network elements, including when executing network element discovery operations, file upload operations, and file download operations. Thus, traditional systems do not support auto-selection of one or more clusters to execute the batch based on the network element's geographic location, and this increases the total time required to execute the batch of tasks. Further, in traditional systems, users may not manually select clusters through labels and selectors.

In view of the foregoing, disclosed herein are systems, methods, and devices for allocating resources for executing tasks. A method described herein includes providing a plurality of tasks to a priority-based backlog queue and provisioning each of the plurality of tasks to one of a plurality of clusters. Provisioning each of the plurality of tasks comprises provisioning based on a proximity-based allocation process. The proximity-based allocation process includes identifying a network element location associated with each of the plurality of tasks, identifying a geographic location for each of the plurality of clusters, and prioritizing a nearest cluster of the plurality of clusters.

Figure 1B:
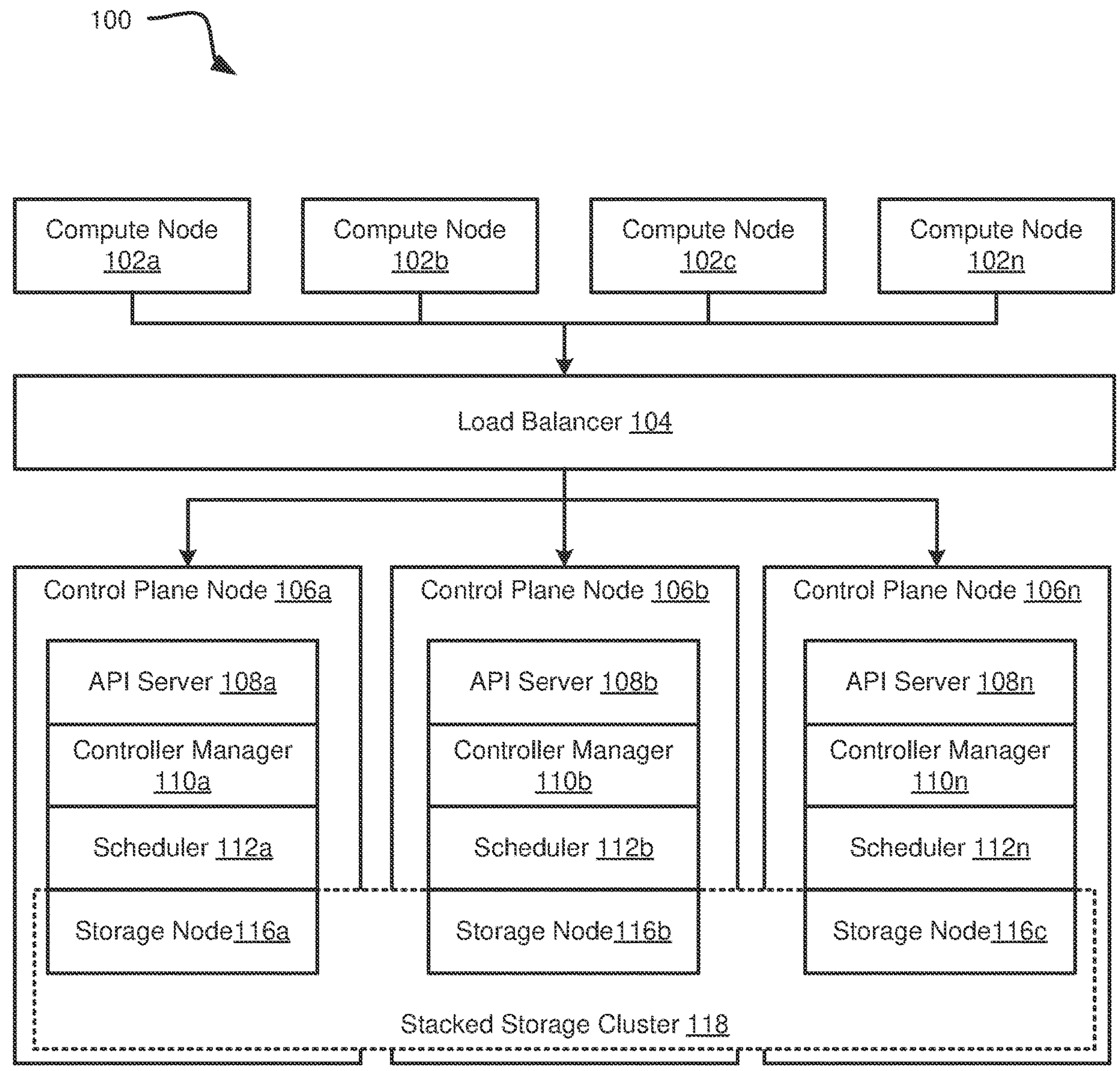
FIG. 1B is a schematic block diagram of a system for automated deployment, scaling, and management of containerized workloads and services, wherein the system draws on storage within a stacked storage cluster.

Referring now to the figures, FIGS. 1A and 1B are schematic illustrations of an example system 100 for automated deployment, scaling, and management of containerized workloads and services. The system 100 facilitates declarative configuration and automation through a distributed platform that orchestrates different compute nodes that may be controlled by central master nodes. The system 100 may include "n" number of compute nodes that can be distributed to handle pods.

The system 100 includes a plurality of compute nodes 102*a*, 102*b*, 102*c*, 102*n* (may collectively be referred to as compute nodes 102 as discussed herein) that are managed by a load balancer 104. The load balancer 104 assigns processing resources from the compute nodes 102 to one or more of the control plane nodes 106*a*, 106*b*, 106*n* (may collectively be referred to as control plane nodes 106 as discussed herein) based on need. In the example implementation illustrated in FIG. 1A, the control plane nodes 106 draw upon a distributed shared storage 114 resource comprising a plurality of storage nodes 116*a*, 116*b* 116*c*, 116*d*, 116*n* (may collectively be referred to as storage nodes 116 as discussed herein). In the example implementation illustrated in FIG. 1B, the control plane nodes 106 draw upon assigned storage nodes 116 within a stacked storage cluster 118.

The control planes 106 make global decisions about each cluster and detect and responds to cluster events, such as initiating a pod when a deployment replica field is unsatisfied. The control plane node 106 components may be run on any machine within a cluster. Each of the control plane nodes 106 includes an API server 108, a controller manager 110, and a scheduler 112.

The API server 108 functions as the front end of the control plane node 106 and exposes an Application Program Interface (API) to access the control plane node 106 and the compute and storage resources managed by the control plane node 106. The API server 108 communicates with the storage nodes 116 spread across different clusters. The API server 108 may be configured to scale horizontally, such that it scales by deploying additional instances. Multiple instances of the API server 108 may be run to balance traffic between those instances.

The controller manager 110 embeds core control loops associated with the system 100. The controller manager 110 watches the shared state of a cluster through the API server 108 and makes changes attempting to move the current state of the cluster toward a desired state. The controller manager 110 may manage one or more of a replication controller, endpoint controller, namespace controller, or service accounts controller.

The scheduler 112 watches for newly created pods without an assigned node, and then selects a node for those pods to run on. The scheduler 112 accounts for individual and collective resource requirements, hardware constraints, software constraints, policy constraints, affinity specifications, anti-affinity specifications, data locality, inter-workload interference, and deadlines.

The storage nodes 116 function as a distributed storage resources with backend service discovery and database. The storage nodes 116 may be distributed across different physical or virtual machines. The storage nodes 116 monitor changes in clusters and store state and configuration data that may be accessed by a control plane node 106 or a cluster. The storage nodes 116 allow the system 100 to support discovery service so that deployed applications can declare their availability for inclusion in service.

In some implementations, the storage nodes 116 are organized according to a key-value store configuration, although the system 100 is not limited to this configuration. The storage nodes 116 may create a database page for each record such that the database pages do not hamper other records while updating one. The storage nodes 116 may collectively maintain two or more copies of data stored across all clusters on distributed machines.

Figure 2:
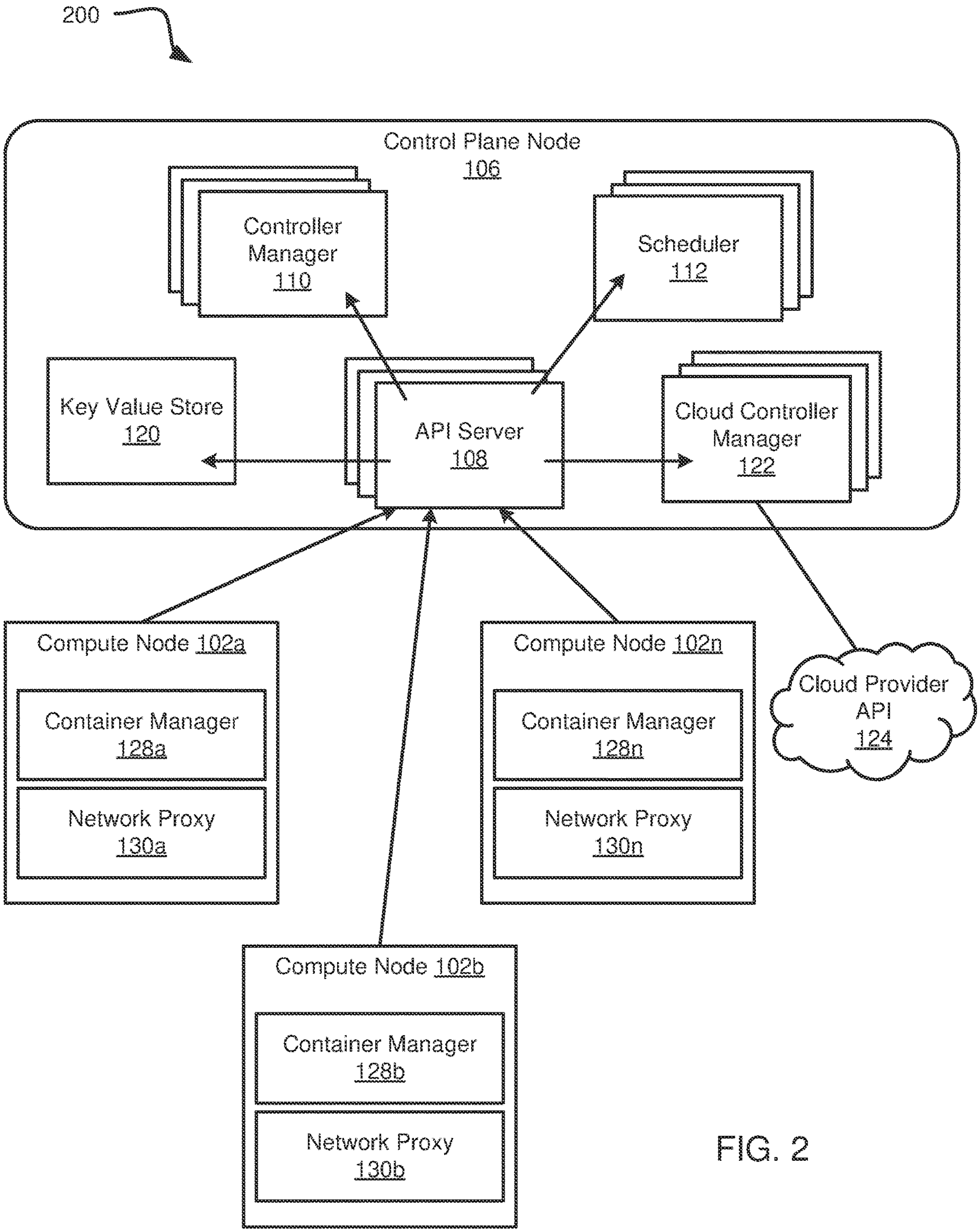
FIG. 2 is a schematic block diagram of a system for automated deployment, scaling, and management of containerized applications.

FIG. 2 is a schematic illustration of a cluster 200 for automating deployment, scaling, and management of containerized applications. The cluster 200 illustrated in FIG. 2 is implemented within the systems 100 illustrated in FIGS. 1A-1B, such that the control plane node 106 communicates with compute nodes 102 and storage nodes 116 as shown in FIGS. 1A-1B. The cluster 200 groups containers that make up an application into logical units for management and discovery.

The cluster 200 deploys a cluster of worker machines, identified as compute nodes 102*a*, 102*b*, 102*n*. The compute nodes 102*a*-102*n* run containerized applications, and each cluster has at least one node. The compute nodes 102*a*-102*n* host pods that are components of an application workload. The compute nodes 102*a*-102*n* may be implemented as virtual or physical machines, depending on the cluster. The cluster 200 includes a control plane node 106 that manages compute nodes 102*a*-102*n* and pods within a cluster. In a production environment, the control plane node 106 typically manages multiple computers and a cluster runs multiple nodes. This provides fault tolerance and high availability.

The key value store 120 is a consistent and available key value store used as a backing store for cluster data. The controller manager 110 manages and runs controller processes. Logically, each controller is a separate process, but to reduce complexity in the cluster 200, all controller processes are compiled into a single binary and run in a single process. The controller manager 110 may include one or more of a node controller, task controller, endpoint slice controller, or service account controller.

The cloud controller manager 122 embeds cloud-specific control logic. The cloud controller manager 122 enables clustering into a cloud provider API 124 and separates components that interact with the cloud platform from components that only interact with the cluster. The cloud controller manager 122 may combine several logically independent control loops into a single binary that runs as a single process. The cloud controller manager 122 may be scaled horizontally to improve performance or help tolerate failures.

The control plane node 106 manages any number of compute nodes 126. In the example implementation illustrated in FIG. 2, the control plane node 106 is managing three nodes, including a first node 126*a*, a second node 126*b*, and an nth node 126*n* (which may collectively be referred to as compute nodes 126 as discussed herein). The compute nodes 126 each include a container manager 128 and a network proxy 130.

The container manager 128 is an agent that runs on each compute node 126 within the cluster managed by the control plane node 106. The container manager 128 ensures that containers are running in a pod. The container manager 128 may take a set of specifications for the pod that are provided through various mechanisms, and then ensure those specifications are running and healthy.

The network proxy 130 runs on each compute node 126 within the cluster managed by the control plane node 106. The network proxy 130 maintains network rules on the compute nodes 126 and allows network communication to the pods from network sessions inside or outside the cluster.

Figure 3:
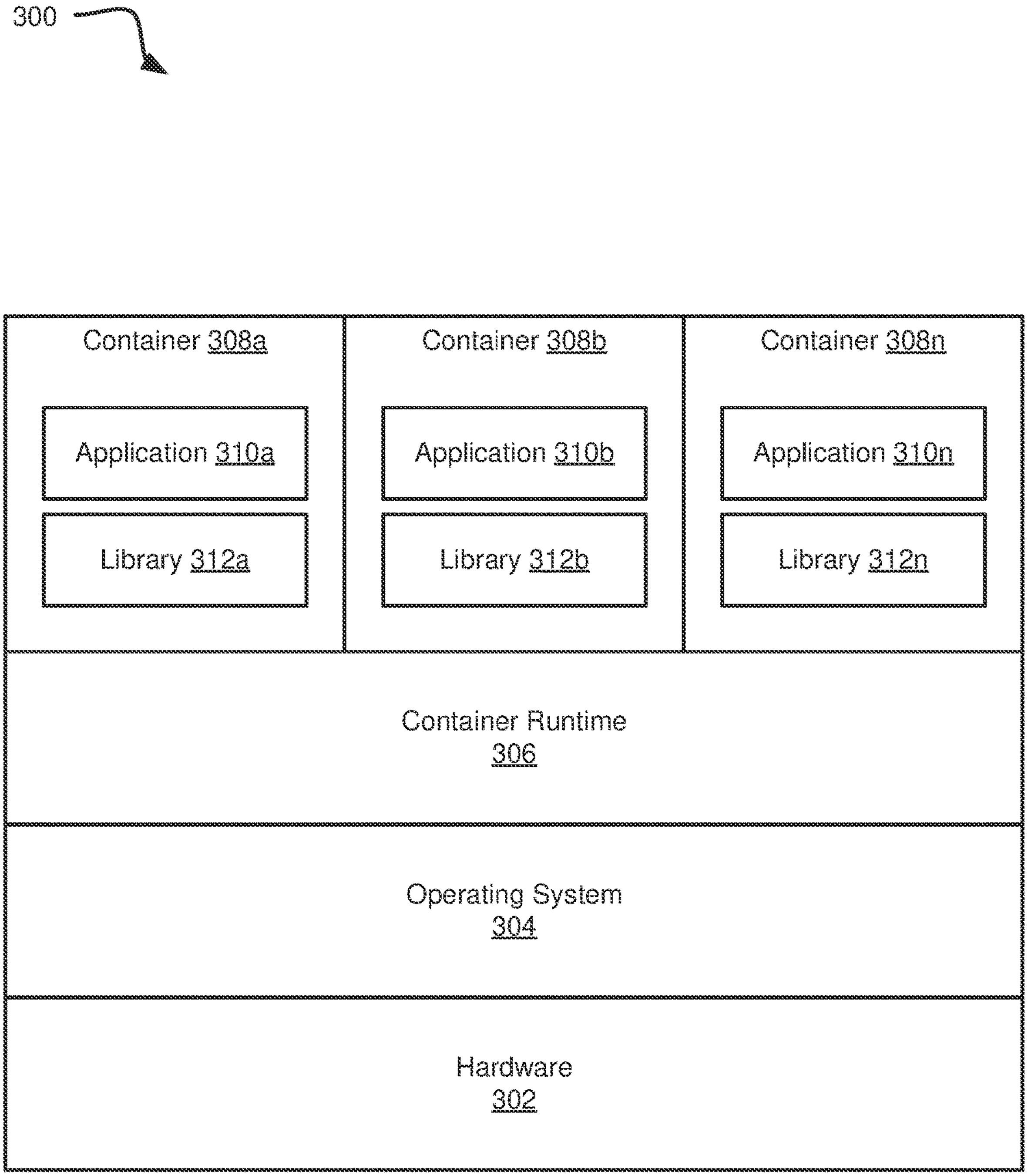
FIG. 3 is a schematic block diagram illustrating a system for managing containerized workloads and services.

FIG. 3 is a schematic diagram illustrating a system 300 for managing containerized workloads and services. The system 300 includes hardware 302 that supports an operating system 304 and further includes a container runtime 306, which refers to the software responsible for running containers 308. The hardware 302 provides processing and storage resources for a plurality of containers 308*a*, 308*b*, 308*n* that each run an application 310 based on a library 312. The system 300 discussed in connection with FIG. 3 is implemented within the systems 100, 200 described in connection with FIGS. 1A-1B and 2.

The containers 308 function similar to a virtual machine but have relaxed isolation properties and share an operating system 304 across multiple applications 310. Therefore, the containers 308 are considered lightweight. Similar to a virtual machine, a container has its own file systems, share of CPU, memory, process space, and so forth. The containers 308 are decoupled from the underlying instruction and are portable across clouds and operating system distributions.

Containers 308 are repeatable and may decouple applications from underlying host infrastructure. This makes deployment easier in different cloud or OS environments. A container image is a ready-to-run software package, containing everything needed to run an application, including the code and any runtime it requires, application and system libraries, and default values for essential settings. By design, a container 308 is immutable such that the code of a container 308 cannot be changed after the container 308 begins running.

The containers 308 enable certain benefits within the system. Specifically, the containers 308 enable agile application creation and deployment with increased ease and efficiency of container image creation when compared to virtual machine image use. Additionally, the containers 308 enable continuous development, integration, and deployment by providing for reliable and frequent container image build and deployment with efficient rollbacks due to image immutability. The containers 308 enable separation of development and operations by creating an application container at release time rather than deployment time, thereby decoupling applications from infrastructure. The containers 308 increase observability at the operating system-level, and also regarding application health and other signals. The containers 308 enable environmental consistency across development, testing, and production, such that the applications 310 run the same on a laptop as they do in the cloud. Additionally, the containers 308 enable improved resource isolation with predictable application 310 performance. The containers 308 further enable improved resource utilization with high efficiency and density.

The containers 308 enable application-centric management and raise the level of abstraction from running an operating system 304 on virtual hardware to running an application 310 on an operating system 304 using logical resources. The containers 304 are loosely coupled, distributed, elastic, liberated micro-services. Thus, the applications 310 are broken into smaller, independent pieces and can be deployed and managed dynamically, rather than a monolithic stack running on a single-purpose machine.

The containers 308 may include any container technology known in the art such as DOCKER, LXC, LCS, KVM, or the like. In a particular application bundle 406, there may be containers 308 of multiple distinct types in order to take advantage of a particular container's capabilities to execute a particular task 416. For example, one task 416 of an application bundle 406 may execute a DOCKER container 308 and another task 416 of the same application bundle 406 may execute an LCS container 308.

The system 300 allows users to bundle and run applications 310. In a production environment, users may manage containers 308 and run the applications to ensure there is no downtime. For example, if a singular container 308 goes down, another container 308 will start. This is managed by the control plane nodes 106, which oversee scaling and failover for the applications 310.

Figure 4:
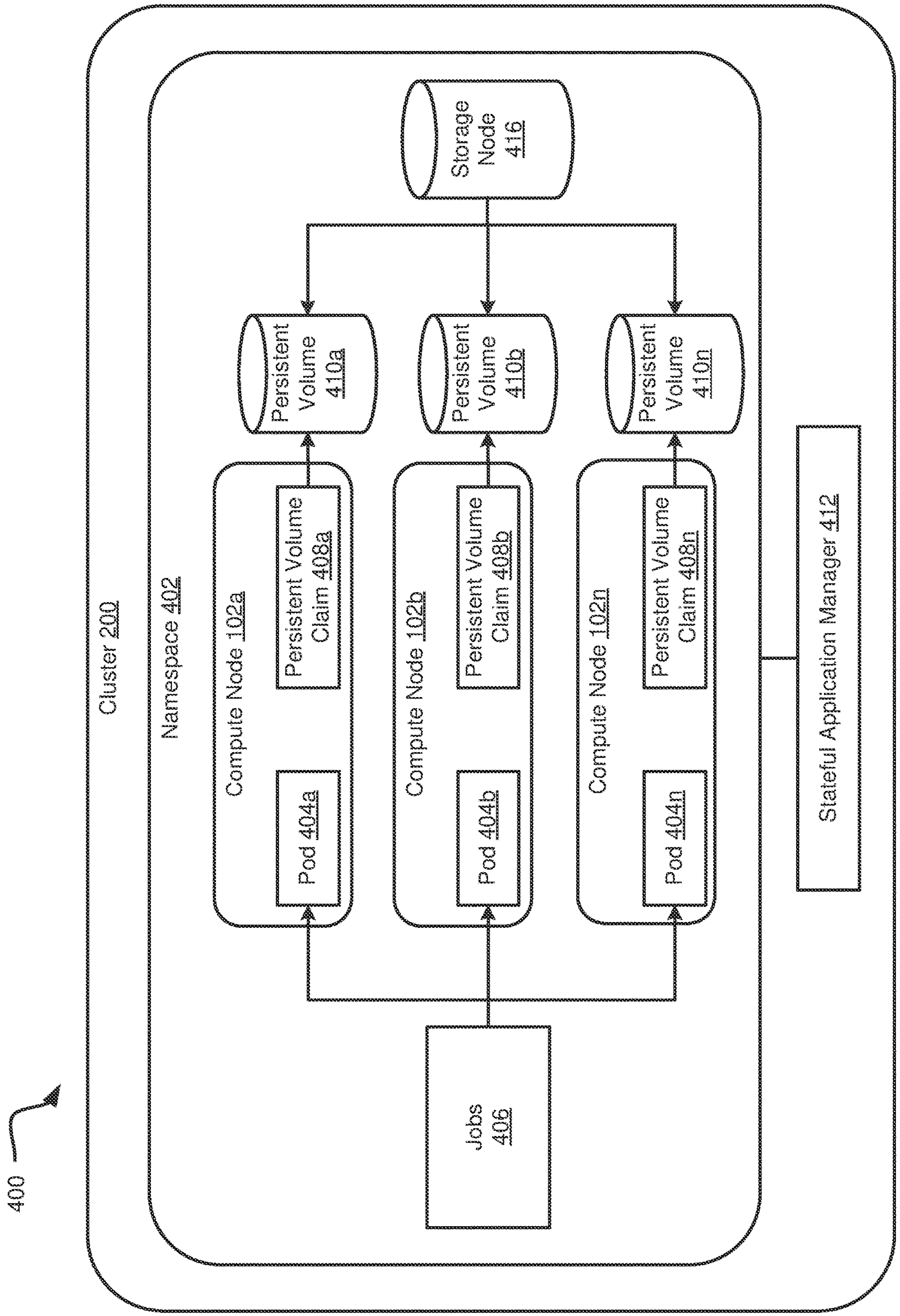
FIG. 4 is a schematic diagram illustrating an example system for implementing a stateful application manager in a containerized workload system.

FIG. 4 is a schematic diagram of an example system 400 for implementing a stateful application manager 412. In specific implementations, the stateful application manager 412 may include a StatefulSet operated by the Kubernetes® containerized workload platform. The stateful application manager 412 is the workload API object used to manage stateful applications.

The system 400 includes a cluster 200, such as the cluster first illustrated in FIG. 2. The cluster 200 includes a namespace 402. Several compute nodes 102 are bound to the namespace 402, and each compute node 102 includes a pod 404 and a persistent volume claim 408. In the example illustrated in FIG. 4, the namespace 402 is associated with three compute nodes 102*a*, 102*b*, 102*n*, but it should be appreciated that any number of compute nodes 102 may include within the cluster 200. The first compute node 102*a* includes a first pod 404*a* and a first persistent volume claim 408*a* that draws upon a first persistent volume 410*a*. The second compute node 102*b* includes a second pod 404*b* and a second persistent volume claim 408*b* that draws upon a second persistent volume 410*b*. Similarly, the third compute node 102*n* includes a third pod 404*n* and a third persistent volume claim 408*n* that draws upon a third persistent volume 410*n*. Each of the persistent volumes 410*b* may draw from a storage node 416. The cluster 200 executes tasks 406 that feed into the compute nodes 102 associated with the namespace 402.

The stateful application manager 412 communicates with each of the first pod 404*a*, the second pod 404*b*, and the third pod 404*n*, and further communicates with each of the first persistent volume claim 408*a*, the second persistent volume claim 408*b*, and the third persistent volume claim 408*n*.

Numerous storage and compute nodes may be dedicated to different namespaces 402 within the cluster 200. The namespace 402 may be referenced through an orchestration layer by an addressing scheme, e.g., <Bundle ID>.<Role ID>.<Name>. In some embodiments, references to the namespace 402 of another task 406 may be formatted and processed according to the JINJA template engine or some other syntax. Accordingly, each task may access the variables, functions, services, etc. in the namespace 402 of another task on order to implement a complex application topology.

Each task 416 executed by the cluster 200 maps to one or more pods 404. Each of the one or more pods 404 includes one or more containers 308. Each resource allocated to the application bundle 406 is mapped to the same namespace 402. The pods 404 are the smallest deployable units of computing that may be created and managed in the systems described herein. The pods 404 constitute groups of one or more containers 308, with shared storage and network resources, and a specification of how to run the containers 308. The pods' 502 contents are co-located and co-scheduled and run in a shared context. The pods 404 are modeled on an application-specific "logical host," i.e., the pods 404 include one or more application containers 308 that are relatively tightly coupled. In non-cloud contexts, application bundles 406 executed on the same physical or virtual machine are analogous to cloud applications executed on the same logical host.

The pods 404 are designed to support multiple cooperating processes (as containers 308) that form a cohesive unit of service. The containers 308 in a pod 404 are co-located and co-scheduled on the same physical or virtual machine in the cluster. The containers 308 can share resources and dependencies, communicate with one another, and coordinate when and how they are terminated. The pods 404 may be designed as relatively ephemeral, disposable entities. When a pod 404 is created, the new pod 404 is schedule to run on a node in the cluster. The pod 404 remains on that node until the pod 404 finishes executing, and then the pod 404 is deleted, evicted for lack of resources, or the node fails.

In some implementations, the shared context of a pod 404 is a set of Linux® namespaces, cgroups, and potentially other facets of isolation, which are the same components of a container 308. The pods 404 are similar to a set of containers 308 with shared namespaces and shared filesystem volumes. The pods 404 can specify a set of shared storage volumes. All containers 308 in the pod 404 can access the shared volumes, which allows those containers 308 to share data. Volumes allow persistent data in a pod 404 to survive in case one of the containers 308 within needs to be restarted.

In some cases, each pod 404 is assigned a unique IP address for each address family. Every container 308 in a pod 404 shares the network namespace, including the IP address and network ports. Inside a pod 404, the containers that belong to the pod 404 can communicate with one another using localhost. When containers 308 in a pod 404 communicate with entities outside the pod 404, they must coordinate how they use the shared network resources. Within a pod 404, containers share an IP address and port space, and can find each other via localhost. The containers 308 in a pod 404 can also communicate with each other using standard inter-process communications.

The stateful application manager 412 manages the deployment and scaling of a set of pods 404 within the cluster 200 and provides guarantees about the ordering and uniqueness of those pods 404. The stateful application manager 412 manages pods 404 that are based on an identical container 308 specification and maintains a sticky identity for each of those pods 404. The pods 404 are created form the same specification but are not interchangeable, such that each pod 404 has a persistent identifier that it maintains across rescheduling.

The stateful application manager 412 assigns unique identifiers to each container 308 copy or pod 404. The stateful application manager 412 enables the capability to store and track data in a persistent volume 410 that is separate from the pods 404. The persistent volumes 410 retrieve data needed for analysis from the storage node 416 and then write back changes as needed. The persistent volumes 410 are connected to a particular pod 404 identifier by the persistent volume claim 408. When ephemeral pods vanish, the data persistent in the persistent volume 410 assigned to that pod 404. If a new pod 404 is created, it is assigned the appropriate identifier and the persistent volume claim 408 can connect back to the same data in the same persistent volume 410.

The system 400 is valuable for application that require one or more of the following: stable and unique network identifiers; stable and persistent storage; ordered and graceful deployment and scaling; or ordered and automated rolling updated. In each of the foregoing, "stable" is synonymous with persistent across pod rescheduling. If an application does not require any stable identifiers or ordered deployment, deletion, or scaling, then the application may be deployed using a workload object that provides a set of stateless replicas.

When pods 404 within the system 400 are being deployed, the pods 404 are created sequentially, in order from {0 . . . N−1}. When pods 404 are being deleted, they are terminated in reverse order, from {N−1 . . . 0}. Before a pod 404 is terminated, its successors must be shutdown.

Figure 5:
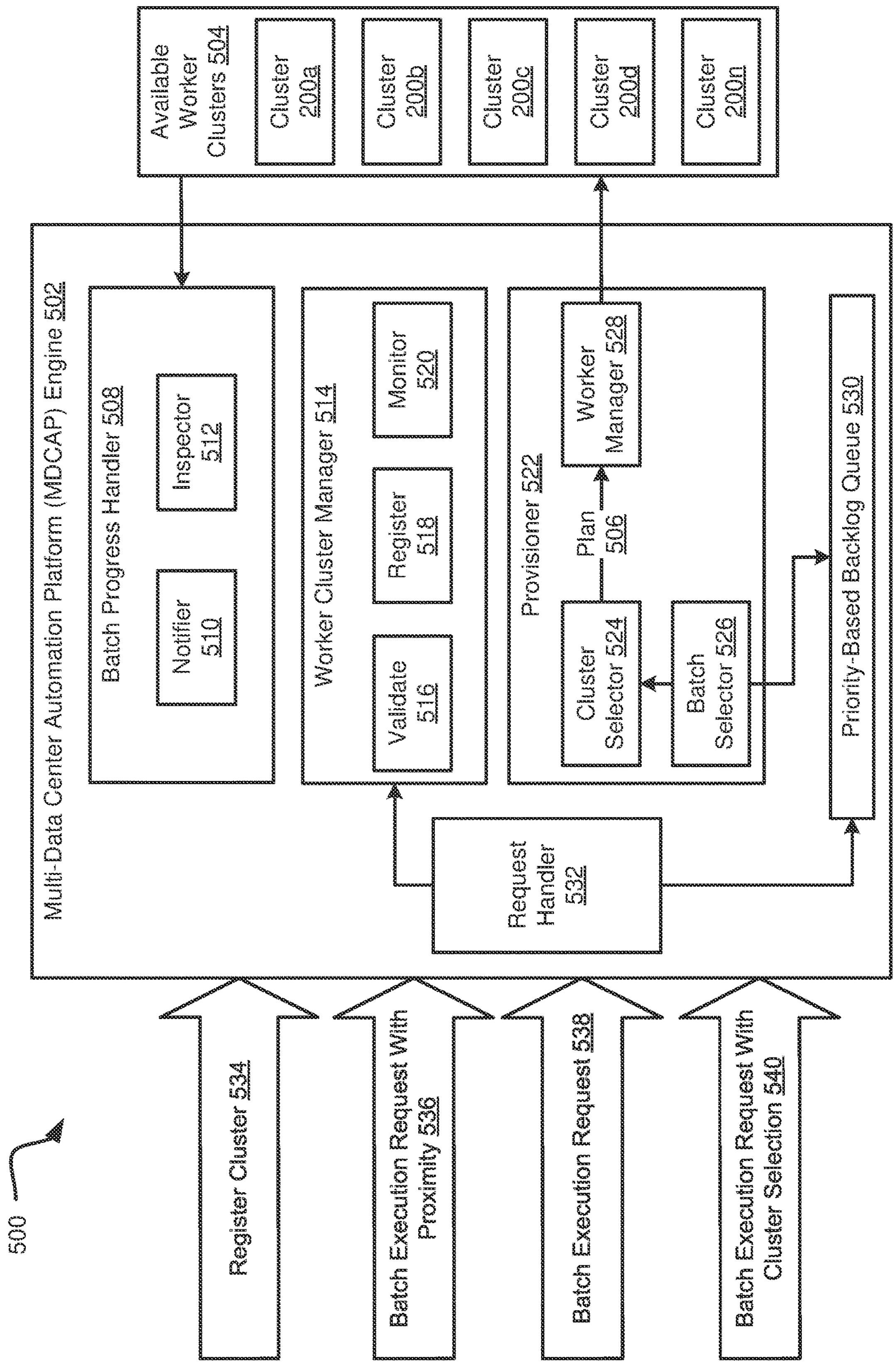
FIG. 5 is a schematic diagram illustrating an example system deploying a multi-data center automation platform engine for provisioning tasks to various clusters.

FIG. 5 is a schematic diagram of an example system 500 deploying a multi-data center automation platform (MDCAP) engine 502. The system 500 is capable of registering clusters for batch execution by specifying the maximum limit in terms of the number of workers and/or the allocation of compute and storage resources. The MDCAP engine 502 communicates with one or more available worker clusters 504 and identifies at least one of those clusters 200*a*-200*n* to execute each batch of tasks (may be referred to as a "batch" herein). The plurality of clusters 200*a*-200*n* depicted in FIG. 5 may collectively be referred to as clusters 200 or "worker clusters" as discussed herein. The clusters 200 allocate compute node 102 resources as depicted in FIG. 2. The various available worker clusters 504 may be distributed across one or more data centers located in different geographic regions.

The MIDCAP engine 502 receives several inputs and may specifically receive a request at 534 to register a new cluster 200. The new cluster 200 is registered within the bank of available worker clusters 504. The MDCAP engine 502 may receive a request at 536 to allocate resources based on proximity for executing a batch of tasks for execution, as discussed further below. The MDCAP engine 502 may receive a request at 538 to allocate resources for executing a batch of tasks for execution without proximity requirements, as discussed further below. The MDCAP engine 502 may receive a request at 540 to allocate resources for executing a batch of tasks based on cluster selection, as discussed further below.

The MDCAP engine 502 includes a batch progress handler 508, a worker cluster manager 514, a provisioner 522, and a request handler 532. The MDCAP engine 502 provisions a plurality of tasks queued within a priority-based backlog queue 530 to various clusters 200 within the bank of available worker clusters 504.

When a batch of tasks is submitted to the MDCAP engine 502, each of the plurality of tasks is first sent to the priority-based backlog queue 530. The provisioner 522 monitors the priority-based backlog queue 530 and selects tasks for execution based on the priority. In some implementations, task priority is provided by a user. Different worker types may be required to execute different jobs, and the jobs will be prioritized to leverage existing workers before tearing down and creating a worker. In an example implementation, the priority-based backlog queue 530 includes three tasks, namely task J1, which is required and must be performed by WorkerType1; task J2, which requires WorkerType2; and task J3, which is required and must be performed by WorkerType1. The provisioner 522 determines it would be preferable to execute J1, J3, and then J2, rather than execute J1, J2, and then J3. For executing task J1, the system creates WorkerType1. For executing task J2, the system destroys WorkerType1 and creates WorkerType2 (assuming the system has capacity only to create one worker). For executing task J3, the system destroys WorkerType2 and re-instantiates WorkerType1. This destroy and create cycle will consume cycles and slow down the overall execution.

The provisioner 522 selects tasks from the priority-based backlog queue 530 and then forwards those tasks to eligible clusters 200 within the bank of available worker clusters 504. When one of the clusters 200*a*-200*n* receives a task or batch of tasks, that clusters 200*a*-200*n* will then provide the task(s) to various compute nodes 102*a*-102*n* as shown in FIG. 2.

The provisioner 522 continuously monitors the batch selection (with the batch selector 524 component) until completion. The provisioner 522 load balances the allocation of tasks to different clusters 200*a*-200*n* within the bank of available worker clusters 504. The provisioner 522 implements static specification of resources and may also implement dynamic provisioning functions that invoke allocation of resources in response to usage. For example, as a database fills up, additional storage volumes may be allocated. As usage of compute resources are allocated, additional processing cores and memory may be allocated to reduce latency.

The provisioner 522 adjusts desired worker counts for different clusters 200. This adjusts the pod 404 count on the nodes within each cluster 200. The provisioner 522 includes a batch selector 526 that reads the batches within the priority-based backlog queue 530. The batch selector 526 prioritizes the highest priority batches and then provides each batch of tasks to a cluster selector 524 based on priority. The priority of the batches within the priority-based backlog queue 530 may be dynamic such that priority is adjusted in real-time based on various factors. This may be performed based on user triggers. For example, if a critical and time-bound job 406 is sitting within the priority-based backlog queue 530, a user might change the priority of this job 406 to ensure it gets ahead within the queue 530. Some jobs are time-bound. For example, maintenance jobs may be required to complete before 3:00 AM.

The cluster selector 524 is responsible for identifying compute resources to complete the batch requests. The cluster selector 524 identifies a cluster 200 to execute each batch of tasks. One or more of the available clusters 200 within the bank of available worker clusters 504 may be located at data centers in different geographic locations. For example, cluster 200*a* might be located at a data center on the East Coast of the United States, cluster 200*b* might be located at a data center on the West Coast of the United States, cluster 200*c* might be located at a data center in India, cluster 200*d* might be located at a data center in Europe, cluster 200*n* might be located at a data center in Korea, and so forth.

The cluster selector 524 generates a plan 506 for executing at least a portion of the batches of tasks within the priority-based backlog queue 530. The plan 506 includes an indication of where each batch of tasks should be forwarded for execution, i.e., which cluster 200*a*-200*n* should be assigned to each batch of tasks. The plan 506 may comprise an indication of how the clusters 200*a*-200*n* were prioritized. In an example implementation, the system includes three servers in three different geographical locations. The system must perform some security scan on each of the three servers (the security scan is a job 406). It is better for the worker closer to the servers to run the scan and the analysis. This is proximity-based work assignment. Another could be latency-based assignment, based on network round-trip time. Another could be specialized resource-based allocation. For example, if a job 406 needs GPUs to run, and if GPUs happen to be in a particular cluster 200, the worker pods 404 will need to be created within the cluster 200.

The planning stage executed by the cluster selector 524 is responsible for selecting the clusters 200*a*-200*n* for executing all tasks within the priority-based backlog queue 530. The generation of the plan 506 is discussed in further detail in connection with FIG. 6. The cluster selector 524 forwards the plan 506 to the worker manager 528 component of the provisioner 522.

The worker manager 528 receives the plan 506 and is then responsible for creating new workers or selecting existing workers. In some implementations, each of the workers is a pod 406 within a KUBERNETES® cluster 200. The worker manager 528 may additionally steal idle workers from other profiles.

The request handler 532 manages batch requests from users by validating requests and queuing those requests for processing by the worker cluster manager 514. The batch requests may include different types of tasks that will be allocated based on the cluster allocation priority algorithm 602 discussed in connection with FIG. 6. The worker cluster manager 514 is responsible for new registration of clusters 200*a*-200*n* and monitoring the health of the clusters 200*a*-200*n*. Specifically, the worker cluster manager 514 validates 516, registers 518, and monitors 520 the clusters 200*a*-200*n*.

The batch progress handler 508 includes a notifier 510 component and an inspector 512 component. As different pools of the batch of tasks are completed, the next set of pools are scheduled to the available worker clusters 504. If any of the assigned clusters 200*a*-200*n* are unhealthy, then cluster selection is performed again to re-plan the desired counts for the remaining clusters to complete the remaining batches of tasks. Completed batches have either success or failure status as determined by the inspector 512. The notifier 510 notifies the subscribers of the success or failure status of the various batches through different notification channels.

Figure 6:
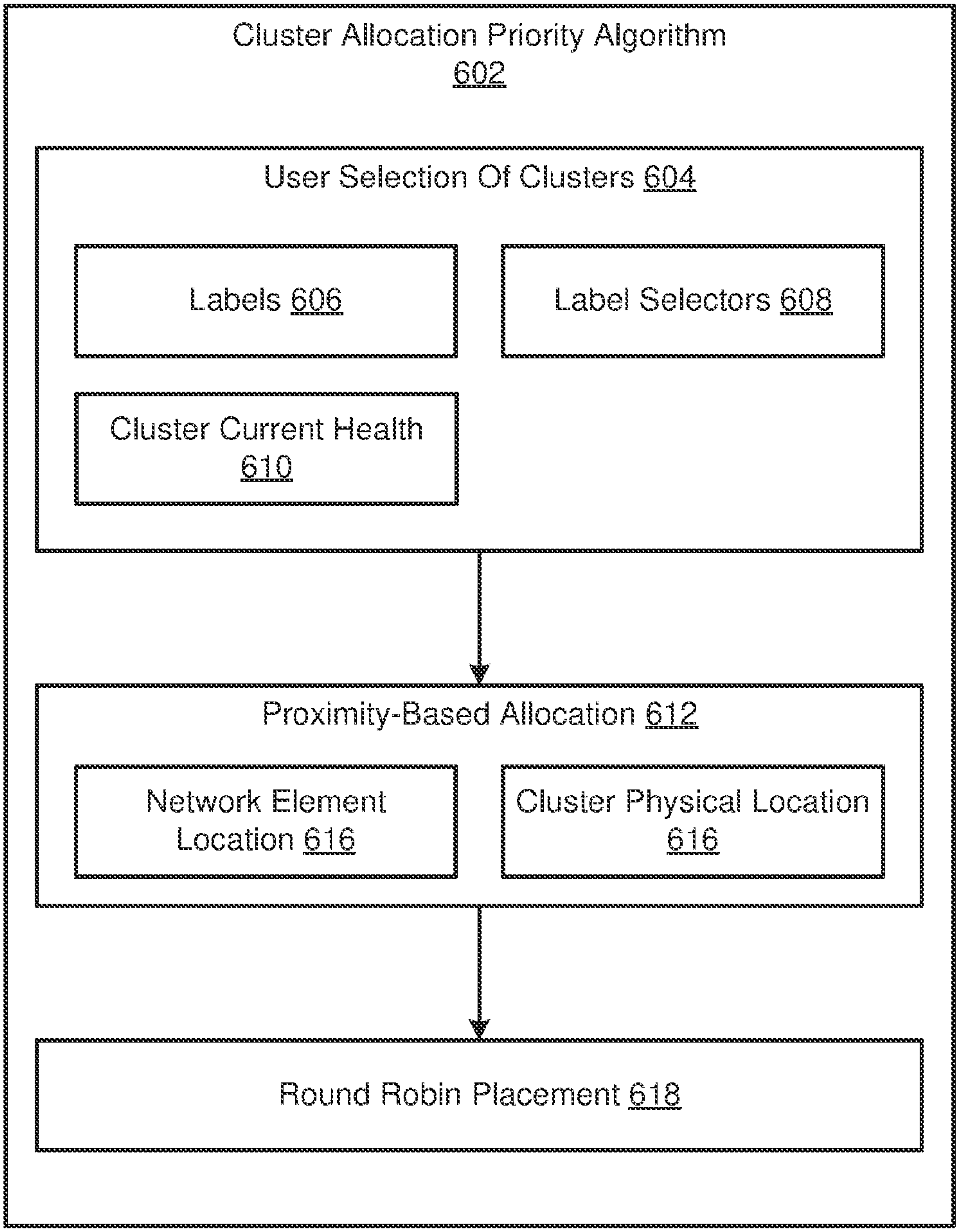
FIG. 6 is a schematic diagram illustrating an example process flow for a cluster allocation priority algorithm.

FIG. 6 is a schematic block diagram of a cluster allocation priority algorithm 602. The algorithm 602 is implemented by the cluster selector 524 and/or the request handler 532 of the MIDCAP engine 502. The example algorithm 602 prioritizes clusters 200*a*-200*n* based on one or more of user selection of clusters 604, proximity-based allocation 614, and round robin placement 616.

In some implementations, the cluster selector 524 first provisions batches based on user selection of clusters 604. This may specifically be based on manual user selection of clusters 200*a*-200*n* through labels 606 and label selectors 608. The cluster selector 524 further prioritizes clusters 200*a*-200*n* based on the current health 610 of the clusters 200*a*-200*n* The user selection of clusters protocol 604 may be used in combination with a proximity-based selection allocation 614 as described below.

Labels 606 are key-value pairs attached to objects such as pods 404 or containers 308. Labels 606 are intended to be used to specify identifying attributes of objects that are meaningful and relevant to users, but do not directly imply semantics to the core system. Labels 606 can be used to organize and select subsets of objects Labels 606 can be attached to objects at creation time and subsequently added and modified at any time. Each object may have a set of key-value labels 606, and each key must be unique for a given object. Labels 606 enable users to map their own organization structures onto system objects in a loosely coupled fashion, without requiring clients to store those mappings.

Labels 606 do not provide uniqueness, and in general, the systems described herein may include many objects carrying the same labels 606. A client or user may identify a set of objects (e.g., pods 404 and/or containers 308), and a label selector 608 may group those objects under a common label 606. The systems described herein may support multiple types of label selectors 608, including equality-based and set-based. A label selector 608 may be made of multiple requirements that all must be satisfied.

In some cases, when proximity-based allocation 614 is enabled in batch execution, the cluster selector 524 selects the cluster 200*a*-200*n* based on geographic proximity to the network element associated with a task. The cluster selector 524 thereby selects the cluster 200 that is geographically closest to the network element location 614 and deprioritizes clusters 200 that are physically farther away from the network element location.

During proximity-based allocation 614, the provisioner 522 sorts batches within the priority-based backlog queue 530 based on the geographic location of their corresponding network elements. The provisioner 522 then maps the clusters 200*a*-200*n* based on their respective geographic locations. The cluster selector 524 factors in the current number of compute nodes 102 and the maximum quantity of compute nodes 102 allocated to each cluster 200. The cluster selector 524 selects the clusters 200*a*-200*n* to fulfill the task requests.

The proximity-based allocation 614 is determined based on the network element location 614 for each batch in terms of latitude and longitude, which is available in inventory. Similarly, the cluster physical location 616 (i.e., the geographic location of the bare metal servers supporting the clusters 200*a*-200*n*) is also available in inventory. This proximity-based allocation 614 strives to bring up clusters 200*a*-200*n* from data centers that are physically closest to the network element location 614. When proximity-based allocation 614 is enabled, network utilization is most efficient. Additionally, the system 500 simplifies the process of cluster selection based on user selection of clusters 604 through labels 606 and label selectors 608.

The cluster selector 514 may further select the clusters 200*a*-200*n* based on round robin placement 618 protocols. The cluster selector 524 identifies healthy clusters 200*a*-200*n* and then implements a round robin allocation algorithm to all available and healthy clusters 200*a*-200*n*. The round robin placement 618 is a technique for load distribution or load balancing for provisioning the plurality of tasks within the priority-based backlog queue 530. The round robin placement 618 is a variant of first come, first served scheduling, wherein no priority or special importance is given to the remaining tasks (after other tasks have been provisioned based on priority). The round robin placement 618 is cyclic in nature, so starvation does not occur.

Figure 7:
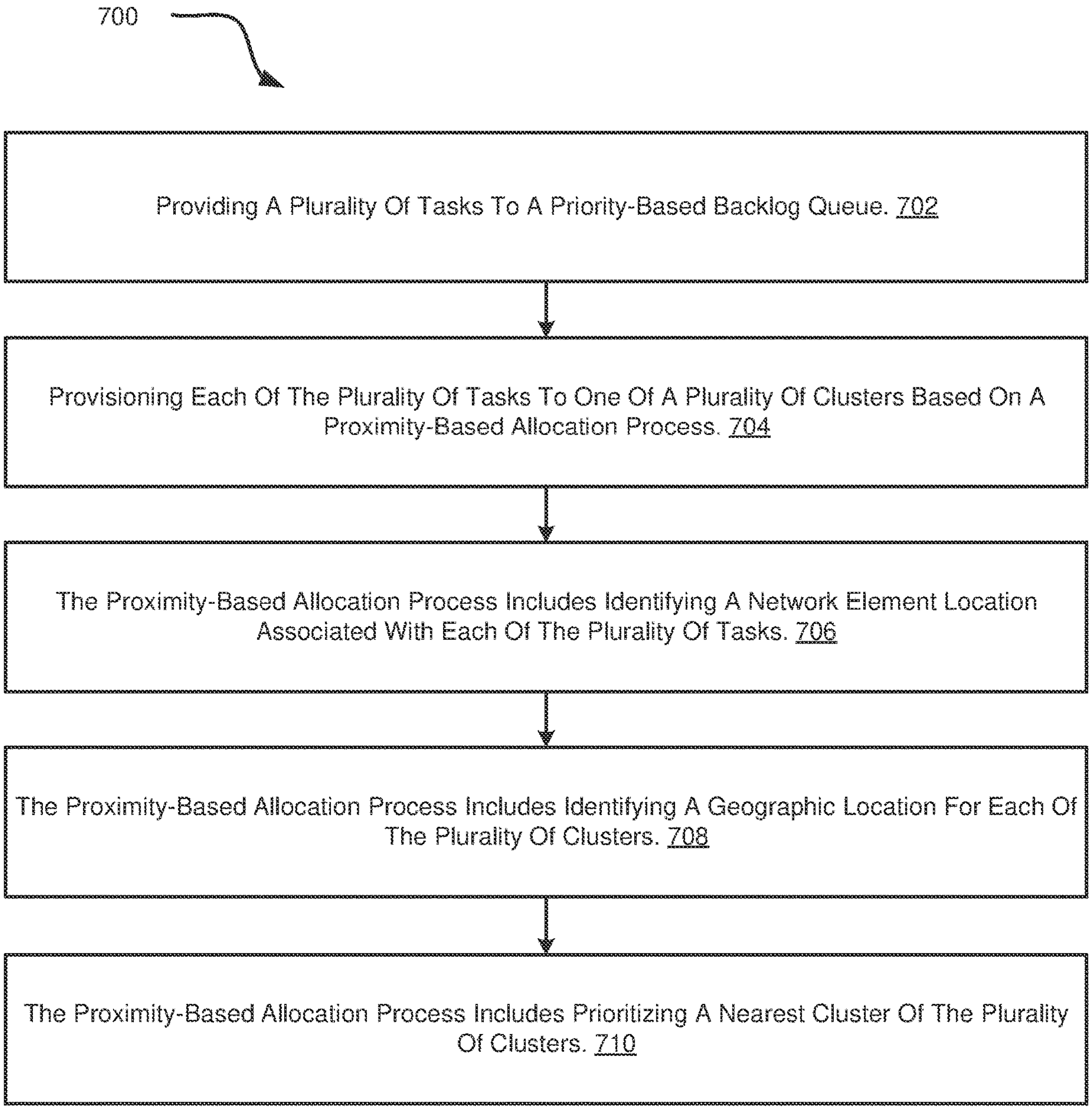
FIG. 7 is a schematic flow chart diagram of an example method for provisioning a plurality of tasks across one or more of a plurality of clusters based on geographic proximity.

FIG. 7 is a schematic flow chart diagram of a method 700 for provisioning batches of tasks based on proximity-based prioritization. The method 700 includes providing at 702 a plurality of tasks to a priority-based backlog queue. The method 700 includes provisioning at 704 each of the plurality of tasks to one of a plurality of clusters based on a proximity-based allocation process. The proximity-based allocation process includes identifying at 706 a network element location associated with each of the plurality of tasks. The proximity-based allocation process includes identifying at 708 a geographic location for each of the plurality of clusters. The proximity-based allocation process includes prioritizing at 710 a nearest cluster of the plurality of clusters.

Figure 8:
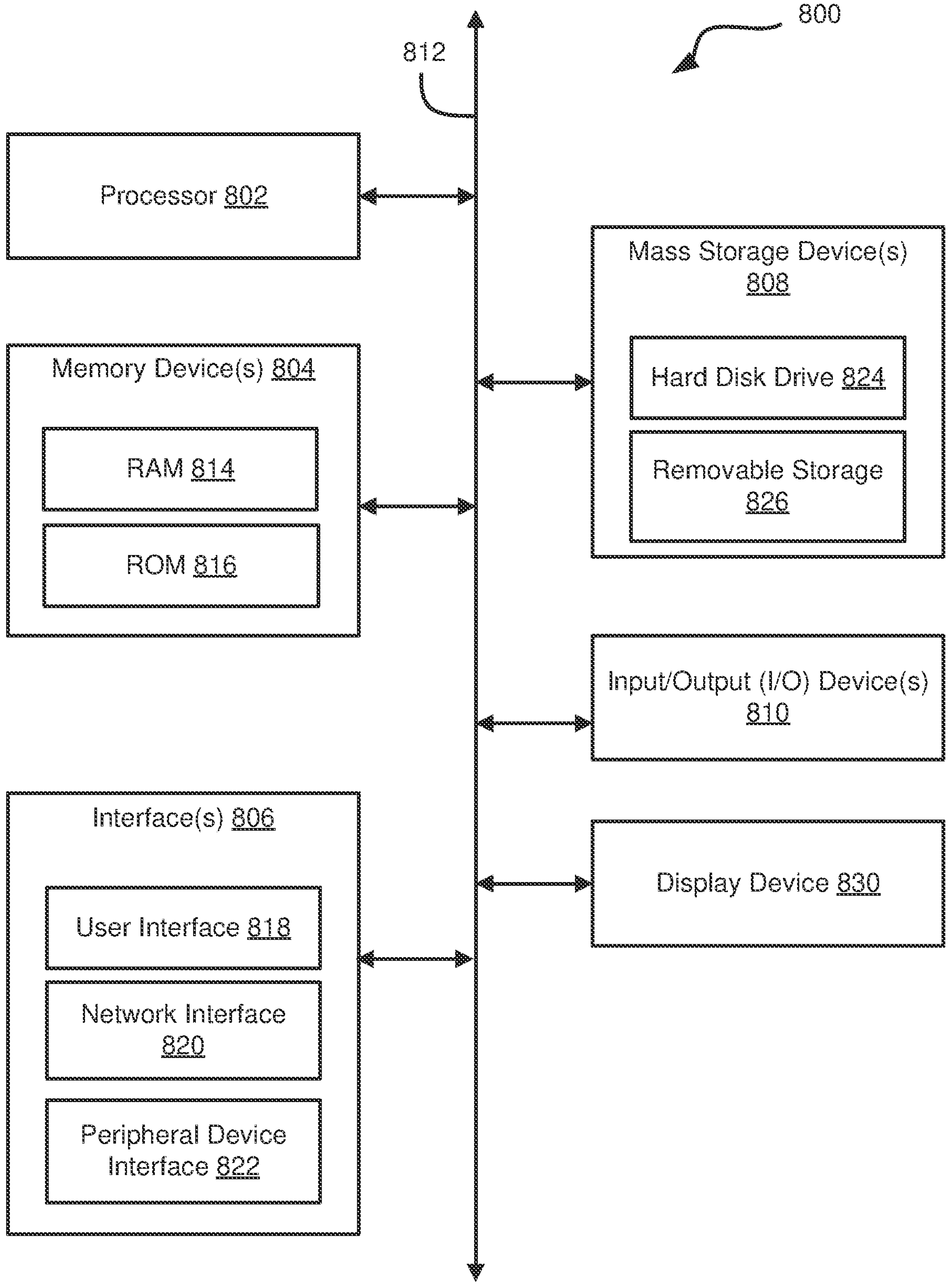
FIG. 8 is a schematic block diagram of an example computing device suitable for implementing methods in accordance with embodiments of the invention.

FIG. 8 illustrates a schematic block diagram of an example computing device 800. The computing device 800 may be used to perform various procedures, such as those discussed herein. The computing device 800 can perform various monitoring functions as discussed herein, and can execute one or more application programs, such as the application programs or functionality described herein. The computing device 800 can be any of a wide variety of computing devices, such as a desktop computer, in-dash computer, vehicle control system, a notebook computer, a server computer, a handheld computer, tablet computer and the like.

The computing device 800 includes one or more processor(s) 804, one or more memory device(s) 804, one or more interface(s) 806, one or more mass storage device(s) 808, one or more Input/output (I/O) device(s) 810, and a display device 830 all of which are coupled to a bus 812. Processor(s) 804 include one or more processors or controllers that execute instructions stored in memory device(s) 804 and/or mass storage device(s) 808. Processor(s) 804 may also include several types of computer-readable media, such as cache memory.

Memory device(s) 804 include various computer-readable media, such as volatile memory (e.g., random access memory (RAM) 814) and/or nonvolatile memory (e.g., read-only memory (ROM) 816). Memory device(s) 804 may also include rewritable ROM, such as Flash memory.

Mass storage device(s) 808 include various computer readable media, such as magnetic tapes, magnetic disks, optical disks, solid-state memory (e.g., Flash memory), and so forth. As shown in FIG. 8, a particular mass storage device 808 is a hard disk drive 824. Various drives may also be included in mass storage device(s) 808 to enable reading from and/or writing to the various computer readable media. Mass storage device(s) 808 include removable media 826 and/or non-removable media.

I/O device(s) 810 include various devices that allow data and/or other information to be input to or retrieved from computing device 800. Example I/O device(s) 810 include cursor control devices, keyboards, keypads, microphones, monitors or other display devices, speakers, printers, network interface cards, modems, and the like.

Display device 830 includes any type of device capable of displaying information to one or more users of computing device 800. Examples of display device 830 include a monitor, display terminal, video projection device, and the like.

Interface(s) 806 include various interfaces that allow computing device 800 to interact with other systems, devices, or computing environments. Example interface(s) 806 may include any number of different network interfaces 820, such as interfaces to local area networks (LANs), wide area networks (WANs), wireless networks, and the Internet. Other interface(s) include user interface 818 and peripheral device interface 822. The interface(s) 806 may also include one or more user interface elements 818. The interface(s) 806 may also include one or more peripheral interfaces such as interfaces for printers, pointing devices (mice, track pad, or any suitable user interface now known to those of ordinary skill in the field, or later discovered), keyboards, and the like.

Bus 812 allows processor(s) 804, memory device(s) 804, interface(s) 806, mass storage device(s) 808, and I/O device (s) 810 to communicate with one another, as well as other devices or components coupled to bus 812. Bus 812 represents one or more of several types of bus structures, such as a system bus, PCI bus, IEEE bus, USB bus, and so forth.

For purposes of illustration, programs and other executable program components are shown herein as discrete blocks, such as block 302 for example, although it is understood that such programs and components may reside at various times in different storage components of computing device 800 and are executed by processor(s) 802. Alternatively, the systems and procedures described herein, including programs or other executable program components, can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to preferred features of further embodiments:

Example 1 is a method. The method includes providing a plurality of tasks to a priority-based backlog queue and provisioning each of the plurality of tasks to one of a plurality of clusters. Provisioning each of the plurality of tasks comprises provisioning based on a proximity-based allocation process comprising identifying a network element location associated with each of the plurality of tasks; identifying a geographic location for each of the plurality of clusters; and prioritizing a nearest cluster of the plurality of clusters.

Example 2 is a method as in Example 1, wherein provisioning each of the plurality of tasks further comprises prioritizing the plurality of clusters based on user selection of one or more of the plurality of clusters.

Example 3 is a method as in any of Examples 1-2, wherein the user selection of the one or more of the plurality of clusters comprises the user identifying one or more preferred labels for executing at least a portion of the plurality of tasks, wherein each of the one or more preferred labels is associated with one or more pods or containers within a containerized workload system.

Example 4 is a method as in any of Examples 1-3, wherein provisioning each of the plurality of tasks further comprises provisioning based on a round robin allocation protocol.

Example 5 is a method as in any of Examples 1-4, wherein provisioning based on the round robin allocation protocol comprises: identifying one or more healthy clusters of the plurality of clusters; identifying available cluster capacity across the plurality of clusters; and assign at least a portion of the plurality of tasks to the healthy and available clusters of the plurality of clusters based on round robin placement.

Example 6 is a method as in any of Examples 1-5, wherein each of the plurality of clusters comprises a plurality of compute nodes.

Example 7 is a method as in any of Examples 1-6, wherein identifying the network element location associated with each of the plurality of tasks comprises retrieving from inventory a latitude and longitude location associated with each of the plurality of tasks; and wherein identifying the geographic location for each of the plurality of clusters comprises retrieving from the inventory a latitude and longitude location associated with a bare metal server supporting each of the plurality of clusters.

Example 8 is a method as in any of Examples 1-7, wherein the nearest cluster is located a shortest physical distance away from a task associated with the network element location when compared with remaining clusters of the plurality of clusters, and wherein prioritizing the nearest cluster of the plurality of clusters comprises: determining whether the nearest cluster is healthy and available; and in response to determining the nearest cluster is healthy and available, generating a plan indicating the task associated with the network element location should be executed by the nearest cluster.

Example 9 is a method as in any of Examples 1-8, wherein provisioning each of the plurality of tasks comprises first provisioning based on manual user selection of clusters and then provisioning based on the proximity-based allocation process.

Example 10 is a method as in any of Examples 1-9, wherein the method is executed by a multi-data center automation platform engine associated with a containerized workload system.

Example 11 is a method as in any of Examples 1-10, wherein the multi-data center automation platform engine further comprises a worker cluster manager configured to: validate a new cluster to be added to a bank of available worker clusters; register the new cluster within the bank of available worker clusters such that the new cluster is eligible to receive tasks provided to the priority-based backlog queue; and monitor health of the plurality of clusters in real-time.

Example 12 is a method as in any of Examples 1-11, further comprising receiving a request to execute the plurality of tasks according to the proximity-based allocation process.

Example 13 is a method as in any of Examples 1-12, further comprising: receiving the plurality of tasks; queuing each of the plurality of tasks in the priority-based backlog queue; and monitoring the priority-based backlog queue based on varying priorities of the plurality of tasks.

Example 14 is a method as in any of Examples 1-13, further comprising load balancing a containerized workload system by adding additional compute nodes based on a quantity of tasks within the priority-based backlog queue.

Example 15 is a method as in any of Examples 1-14, further comprising continuously monitoring the priority-based backlog queue until each of the plurality of tasks within the priority-based backlog queue has been executed.

Example 16 is a method as in any of Examples 1-15, wherein the method is executed by a containerized workload system comprising a plurality of compute nodes, and wherein the method further comprises: allocating the plurality of compute nodes across the plurality of clusters based on need with a load balancer.

Example 17 is a method as in any of Examples 1-16, wherein allocating the plurality of compute nodes across the plurality of clusters comprises assigning one or more of the plurality of compute nodes to one of a plurality of control plane nodes within the containerized workload system, and wherein each of the plurality of control plane nodes comprises: an Application Program Interface (API) server; a controller manager; and a scheduler; wherein each of the plurality of control plane nodes communicates with at least one storage node.

Example 18 is a method as in any of Examples 1-17, wherein each of the plurality of control plane nodes communicates with a distributed shared storage resource comprising a plurality of storage nodes.

Example 19 is a method as in any of Examples 1-18, wherein each of the plurality of clusters comprises a control plane node and a plurality of compute nodes, and wherein each of the plurality of compute nodes comprises a container manager and a network proxy.

Example 20 is a method as in any of Examples 1-19, further comprising, in response to provisioning a task of the plurality of tasks to one of the plurality of clusters: assigning the task to a compute node associated with the cluster, wherein the compute node is bound to a namespace; assigning the task to a pod within the compute node; accessing data for completing task by drawing upon a persistent volume by implementing a persistent volume claim.

Example 21 is a system including one or more processors each configured to execute instructions stored in non-transitory computer readable storage medium, the instructions comprising any of the method steps of Examples 1-20.

Example 22 is non-transitory computer readable storage medium storing instructions for execution by one or more processors, the instructions comprising any of the method steps of Examples 1-20.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that any features of the above-described arrangements, examples, and embodiments may be combined in a single embodiment comprising a combination of features taken from any of the disclosed arrangements, examples, and embodiments.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

Note that an application bundle 406 as configured in the foregoing description may be instantiated and used or may be saved as a template that can be used and modified later.

What is claimed is:

1. A method comprising:

providing a plurality of tasks to a priority-based backlog queue; and provisioning each of the plurality of tasks to one of a plurality of clusters;

wherein provisioning each of the plurality of tasks from the priority-based backlog queue based on priority, comprises provisioning based on a proximity-based allocation process comprising:

identifying a network element location associated with each of the plurality of tasks;

identifying a geographic location for each of the plurality of clusters; and prioritizing a nearest cluster of the plurality of clusters based on the identified network element location associated with each of the plurality of tasks and the identified geographic location for each of the plurality of clusters;

wherein provisioning each of the plurality of tasks further comprises provisioning based on a round robin allocation protocol comprising:

identifying one or more healthy clusters of the plurality of clusters;

identifying available cluster capacity across the plurality of clusters; and assigning at least a portion of the plurality of tasks to the healthy and available clusters of the plurality of clusters based on round robin placement.

2. The method of claim 1, wherein provisioning each of the plurality of tasks further comprises prioritizing the plurality of clusters based on user selection of one or more of the plurality of clusters.

3. The method of claim 2, wherein the user selection of the one or more of the plurality of clusters comprises the user identifying one or more preferred labels for executing at least a portion of the plurality of tasks, wherein each of the one or more preferred labels is associated with one or more pods or containers within a containerized workload system.

4. The method of claim 1, wherein each of the plurality of clusters comprises a plurality of compute nodes.

5. The method of claim 1, wherein the nearest cluster is located a shortest physical distance away from a task associated with the network element location when compared with remaining clusters of the plurality of clusters, and wherein prioritizing the nearest cluster of the plurality of clusters comprises:

determining whether the nearest cluster is healthy and available; and in response to determining the nearest cluster is healthy and available, generating a plan indicating the task associated with the network element location should be executed by the nearest cluster.

6. The method of claim 1, wherein provisioning each of the plurality of tasks comprises first provisioning based on manual user selection of clusters and then provisioning based on the proximity-based allocation process.

7. The method of claim 1, wherein the method is executed by a multi-data center automation platform engine associated with a containerized workload system, and wherein the multi-data center automation platform engine comprises a worker cluster manager configured to:

validate a new cluster to be added to a bank of available worker clusters;

register the new cluster within the bank of available worker clusters such that the new cluster is eligible to receive tasks provided to the priority-based backlog queue; and monitor health of the plurality of clusters in real-time.

8. The method of claim 1, wherein identifying the network element location associated with each of the plurality of tasks comprises retrieving from inventory a latitude and longitude location associated with each of the plurality of tasks; and wherein identifying the geographic location for each of the plurality of clusters comprises retrieving from the inventory a latitude and longitude location associated with a bare metal server supporting each of the plurality of clusters.

9. A system comprising one or more processors configured to execute instructions stored in non-transitory computer readable storage medium, the instructions comprising:

providing a plurality of tasks to a priority-based backlog queue; and provisioning each of the plurality of tasks to one of a plurality of clusters;

wherein provisioning each of the plurality of tasks from the priority-based backlog queue based on priority, comprises provisioning based on a proximity-based allocation process comprising:

identifying a network element location associated with each of the plurality of tasks;

identifying a geographic location for each of the plurality of clusters; and prioritizing a nearest cluster of the plurality of clusters based on the identified network element location associated with each of the plurality of tasks and the identified geographic location for each of the plurality of clusters;

wherein the instructions are such that provisioning each of the plurality of tasks further comprises provisioning based on a round robin allocation protocol comprising:

identifying one or more healthy clusters of the plurality of clusters;

identifying available cluster capacity across the plurality of clusters; and assigning at least a portion of the plurality of tasks to the healthy and available clusters of the plurality of clusters based on round robin placement.

10. The system of claim 9, wherein the instructions are such that provisioning each of the plurality of tasks further comprises prioritizing the plurality of clusters based on user selection of one or more of the plurality of clusters; and wherein the user selection of the one or more of the plurality of clusters comprises the user identifying one or more preferred labels for executing at least a portion of the plurality of tasks, wherein each of the one or more preferred labels is associated with one or more pods or containers within a containerized workload system.

11. The system of claim 9, wherein the instructions are such that the nearest cluster is located a shortest physical distance away from a task associated with the network element location when compared with remaining clusters of the plurality of clusters, and wherein prioritizing the nearest cluster of the plurality of clusters comprises:

determining whether the nearest cluster is healthy and available; and in response to determining the nearest cluster is healthy and available, generating a plan indicating the task associated with the network element location should be executed by the nearest cluster.

12. The system of claim 9, wherein the instructions are such that identifying the network element location associated with each of the plurality of tasks comprises retrieving from inventory a latitude and longitude location associated with each of the plurality of tasks; and wherein identifying the geographic location for each of the plurality of clusters comprises retrieving from the inventory a latitude and longitude location associated with a bare metal server supporting each of the plurality of clusters.

13. Non-transitory computer readable storage medium storing instructions for execution by one or more processors, the instructions comprising:

providing a plurality of tasks to a priority-based backlog queue; and provisioning each of the plurality of tasks to one of a plurality of clusters;

wherein provisioning each of the plurality of tasks from the priority-based backlog queue based on priority, comprises provisioning based on a proximity-based allocation process comprising:

identifying a network element location associated with each of the plurality of tasks;

identifying a geographic location for each of the plurality of clusters; and prioritizing a nearest cluster of the plurality of clusters based on the identified network element location associated with each of the plurality of tasks and the identified geographic location for each of the plurality of clusters;

wherein the instructions are such that provisioning each of the plurality of tasks further comprises provisioning based on a round robin allocation protocol comprising:

identifying one or more healthy clusters of the plurality of clusters;

identifying available cluster capacity across the plurality of clusters; and assigning at least a portion of the plurality of tasks to the healthy and available clusters of the plurality of clusters based on round robin placement.

14. The non-transitory computer readable storage medium of claim 13, wherein the instructions are such that provisioning each of the plurality of tasks further comprises prioritizing the plurality of clusters based on user selection of one or more of the plurality of clusters; and wherein the user selection of the one or more of the plurality of clusters comprises the user identifying one or more preferred labels for executing at least a portion of the plurality of tasks, wherein each of the one or more preferred labels is associated with one or more pods or containers within a containerized workload system.

15. The non-transitory computer readable storage medium of claim 13, wherein the instructions are such that the nearest cluster is located a shortest physical distance away from a task associated with the network element location when compared with remaining clusters of the plurality of clusters, and wherein prioritizing the nearest cluster of the plurality of clusters comprises:

determining whether the nearest cluster is healthy and available; and in response to determining the nearest cluster is healthy and available, generating a plan indicating the task associated with the network element location should be executed by the nearest cluster.

16. The non-transitory computer readable storage medium of claim 13, wherein the instructions are such that identifying the network element location associated with each of the plurality of tasks comprises retrieving from inventory a latitude and longitude location associated with each of the plurality of tasks; and wherein identifying the geographic location for each of the plurality of clusters comprises retrieving from the inventory a latitude and longitude location associated with a bare metal server supporting each of the plurality of clusters.

* * * * *